(12) United States Patent
Stucki (10) Patent No.: US 9,810,080 B2
(45) Date of Patent: Nov. 7, 2017

(54) DEVICE FOR SEPARATING WATER DROPLETS FROM A GAS OR VAPOR FLOW

(71) Applicant: ALSTOM Technology Ltd, Baden (CH)

(72) Inventor: Christian Peter Stucki, Zürich (CH)

(73) Assignee: General Electric Technology GmbH, Baden (CH)

( * ) Notice: Subject to any disclaimer, the term of this patent is extended or adjusted under 35 U.S.C. 154(b) by 683 days.

(21) Appl. No.: 14/031,583

(22) Filed: Sep. 19, 2013

(65) Prior Publication Data

US 2014/0017066 A1 Jan. 16, 2014

Related U.S. Application Data

(63) Continuation of application No. PCT/EP2012/055165, filed on Mar. 23, 2012.

(30) Foreign Application Priority Data

Mar. 23, 2011 (CH) ...................................... 0506/11

(51) Int. Cl.
*F01D 9/02* (2006.01)
*B01D 45/04* (2006.01)

(52) U.S. Cl.
CPC .............. *F01D 9/02* (2013.01); *B01D 45/04* (2013.01)

(58) Field of Classification Search
CPC ........... F01D 9/02; B01D 45/06; B01D 45/08; B01D 45/10; F22B 37/26; F05D 2230/31; F05D 2240/126; F05D 2250/184

USPC .................................................... 55/440, 464
See application file for complete search history.

(56) References Cited

U.S. PATENT DOCUMENTS

| 1,616,802 A | 2/1927 | Hosch |
| 1,896,656 A | 2/1933 | Anderson |
| 2,463,382 A | 3/1949 | Hobbs |
| 2,479,625 A | 8/1949 | Kimmell |

(Continued)

FOREIGN PATENT DOCUMENTS

| DE | FR 2173873 A1 * 10/1973 ............. B01D 45/08 |
| DE | 25 10 754 10/1976 |

(Continued)

OTHER PUBLICATIONS

Translation of Description DE2642803, Retrieved Jan. 25, 2017, EPO.*

(Continued)

*Primary Examiner* — Woody Lee, Jr.
*Assistant Examiner* — Jesse Prager
(74) *Attorney, Agent, or Firm* — GE Global Patent Operation; Cynthia W. Flanigan (57) ABSTRACT

A moisture separator for a steam turbine power plant for separating moisture from a flow of vapor or gas that includes a bundle of vanes having a corrugated portion and a trailing edge. The trailing edge includes means to collect moisture on the surfaces of the trailing edge. These means can include a clip-like attachment, or a U-shape of the trailing edge itself. The collection means on the trailing edge contribute to the overall moisture separation efficiency of the moisture separator and a decrease of risk of damage to the steam turbine driven by the steam flow.

6 Claims, 6 Drawing Sheets

(56) References Cited

U.S. PATENT DOCUMENTS

| | | | | |
|---|---|---|---|---|
| 2,643,736 | A * | 6/1953 | Smith | B01D 45/08 55/440 |
| 3,338,035 | A | 8/1967 | Dinkelacker | |
| 3,849,095 | A * | 11/1974 | Regehr | B01D 45/08 55/394 |
| 3,912,471 | A * | 10/1975 | Cotton, Jr. | B01D 45/08 55/440 |
| 4,198,215 | A * | 4/1980 | Regehr | B01D 45/08 55/440 |
| 4,342,570 | A | 8/1982 | Marjollet et al. | |
| 4,377,941 | A | 3/1983 | Zacharias | |
| 4,430,101 | A * | 2/1984 | Sixsmith | B01D 45/06 55/440 |
| 6,083,302 | A * | 7/2000 | Bauver, II | B01D 45/08 55/440 |
| 7,931,720 | B2 * | 4/2011 | Stucki | F22B 37/28 415/115 |
| 2008/0290532 | A1 * | 11/2008 | Kooijman | B01D 1/305 261/108 |
| 2009/0101014 | A1 * | 4/2009 | Baseotto | B01D 45/08 95/272 |
| 2010/0326026 | A1 * | 12/2010 | Bratton | B01D 45/08 55/440 |

FOREIGN PATENT DOCUMENTS

| | | | | |
|---|---|---|---|---|
| DE | 2642803 | A1 * | 4/1978 | B01D 45/08 |
| EP | 0 462 687 | | 12/1991 | |
| EP | 1 755 763 | | 2/2007 | |
| FR | 2486425 | A1 | 1/1982 | |
| GB | 1188938 | A * | 4/1970 | B01D 45/06 |
| GB | 1465044 | A | 2/1977 | |
| SU | 1792725 | A1 | 2/1933 | |
| SU | 850159 | | 7/1981 | |
| SU | 1523833 | A1 | 11/1989 | |

OTHER PUBLICATIONS

Zhongan, "Wet dust collection technology and application thereof", pp. 194-195, Oct. 31, 1999.

Office Action issued in connection with corresponding CN Application No. 201280014762.6 on Aug. 5, 2014.

\* cited by examiner

DEVICE FOR SEPARATING WATER DROPLETS FROM A GAS OR VAPOR FLOW

CROSS-REFERENCE TO RELATED APPLICATIONS

This application claims priority to PCT/EP2012/055165 filed Mar. 23, 2012, which in turn claims priority to Swiss application 00506/11 filed Mar. 23, 2011, both of which are hereby incorporated in their entireties.

TECHNICAL FIELD

The present disclosure relates to an apparatus capable of separating out liquid droplets from a gas or a vapor flowing through the apparatus. In the following disclosure, such apparatus will be referred to as a moisture separator. The moisture separator apparatus pertains in particular to an apparatus comprising chevron-type plates. The present invention pertains in particular to a moisture separator suitable for use in a power plant for the generation of electricity comprising steam turbines.

BACKGROUND

Moisture separators are of particular use in the electricity generating and process industries. For example, steam turbine power plants frequently comprise moisture separators in order to minimize the amount of water droplets in the pressurized steam driving the steam turbine and thereby minimize the risk of damage to turbine blading and other components due to erosion and corrosion. A moisture separator is arranged in a power plant so to subject the steam flow to moisture separation prior to its entry to the turbines.

A type of moisture separator known from U.S. Pat. No. 4,342,570 comprises stacked bundles of parallel and spaced-apart corrugated wafers or chevron-type plates housed in panels that are bolted to a support structure. A perforated sheet bolted to the support structure and placed upstream from the panels distributes the incident flow of wet steam in a uniform manner. The corrugated wafers are positioned so that the corrugations run at right angles to the direction of flow of the steam. This imparts a wave-like motion to the steam as it flows between the parallel and spaced-apart wafers and past the corrugations, so that the water droplets, having more inertia than the surrounding steam, are intercepted by the corrugations instead of remaining entrained in the steam. The corrugated wafers are tilted down at an angle relative to the horizontal, so that the trapped droplets run down the troughs of the corrugations to gutters that are placed to capture the water as it leaves the corrugated plates. The water is removed from the moisture separator through drain tubes connected to the ends of the gutters.

EP462687 discloses a moisture separator having a stack of spaced-apart vanes comprising members arranged to form a zigzag-shaped contour. A flow of gas or vapor flows through the spaces between the vanes encountering the zigzag shape of the vanes. Each member of the vanes has upstream and downstream cavities, in which water droplets are collected and can run down, and the water can be collected at the bottom end of the vane. The cavities on the members require that the space between the vanes be of a given minimum dimension.

EP 1755763 discloses a further moisture separator device having spaced-apart parallel profiled plates, between which passes a vapor flow. The device comprises one or more ribs extending at right angles to the vapor flow direction and designed to generate a flow resistance. The profiled plates are essentially corrugated plates, which comprise on each maximum of its profile a protrusion or pocket directed opposite the vapor flow direction and designed to catch the moisture and direct it to a collection volume.

SUMMARY

The present invention is directed to a moisture separating apparatus having an improved separation efficiency compared to an apparatus of the prior art.

A moisture separator according to the invention comprises, a housing having an inlet for a vapor or gas flow having a direction of flow, a plurality of corrugated vanes arranged parallel and spaced apart evenly from one another and oriented vertically inside the housing, and where the corrugated vanes are arranged with respect to the direction of the vapor flow through the apparatus such that the corrugations run at right angles to the direction of the vapor flow. Each vane comprises a trailing edge opposite the vapor flow inlet that is substantially planar and free of corrugations.

The vapor or gas having entered the moisture separator via the inlet, distributes over the corrugated vanes flows and passes between the vanes. As it encounters the corrugated contour of the vanes, having contour minima and maxima spaced periodically, it is forced into an undulating path, whereby moisture entrained in the vapor and having greater inertia is trapped in the corrugations. The vapor flow leaves the vanes via the trailing edge.

In particular, according to the invention, the trailing edge of each vane comprises a means to direct moisture on its surface in the form of droplets and/or films to collect and flow to the bottom end of the vanes' trailing edge or back into the corrugated portion of the vane, where the moisture film can flow down along one of the corrugations to the bottom of the vane. The means to direct the moisture can be part of the trailing edge itself having a U-shape at its end, a device attached to the trailing edge, or a contour on the trailing edge's surface.

Such measure on the vanes' trailing edge allows the removal of moisture from the vapor or gas flow via the trailing edge and without the need of pockets on the corrugated part of the vane. By the modification of the trailing edge by means of the inventive features, the accumulation of water films near the trailing edges are reduced and an over-loading of the chevrons separator vanes with water droplets near the trailing edge of the vanes are prevented. Any re-entrainment of water into the steam flow as it leaves the plates is reduced or even prevented. Because the collection of water droplet at the trailing edge is assured, the spacing between adjacent plates can be kept small. A smaller spacing between corrugated vanes effects a greater separation efficiency. The overall separation efficiency of the moisture separator apparatus according to the invention is thus increased over moisture separators of the prior art.

The moisture separator allows the collection of the remaining moisture at the trailing edge of the vanes. Both the number and size of droplets entrained in the resulting steam flow will be effectively reduced.

If the moisture separator is installed in a steam turbine power plant prior to a steam turbine, the inventive measure effects that there will be reduced risk of erosion and corrosion to the steam turbine components. As such, the inventive measure effects an increased operating lifetime of the steam turbine. If the moisture separator is installed in a steam turbine power plant prior to a reheater bundle, which is followed by a steam turbine, an increased separation efficiency of the moisture separation apparatus effects that less heating steam will be required in the reheater, which in turn is beneficial to the overall performance of the turbine.

The corrugation of the vanes can be any kind of periodic contour, for example sine wave shaped, or symmetric triangular-shaped.

The trailing edge of each vane is shaped substantially planar having a first and second side, and a short and a long edge. The short edge extends in the direction of the vapor flow, and the long edge extends parallel to the maxima and minima of the corrugations of the vanes. Each vane has arranged on or in its trailing edge the means to collect the water droplets or water film and direct them to the bottom of the vane, where it can be collected in a vessel and removed from the apparatus.

In a first embodiment of the invention, the trailing edge of each vane comprises a clip, which extends along part of length of the trailing edge's long side, envelops the end face of the long side of the trailing edge and extends along its first and second side toward the corrugations. The clip may be attached to the trailing edge for example by means of a spot weld.

In one variant, the clip extends, when viewed in cross-section at right angles to the corrugation's maxima, parallel to the first and second side surface of the trailing edge. The clip extends over a small portion of the trailing edge, where one edge of the clip extends from the end face of the trailing to the beginning of the corrugations, where in particular, that edge of the clip extends from the end face of the trailing edge in a downward direction toward the corrugation. For example, the edge can extend in exact vertical direction. In a particular variant of this embodiment, the clip has, in a top view, a triangular shape, where the triangular clip has a long side facing the vapor flow and extending vertically downward.

The triangularly shaped clip effects a diversion of droplets or films of moisture by way of the downwardly extending edge of the clip back toward the corrugations, where the moisture will flow along the corrugation to the to the bottom of the trailing edge, where it can be collected and removed from the apparatus.

In a further embodiment of the invention, the trailing edge of each vane comprises a clip, which extends along the entire length of the trailing edge's long side, envelops the end face of the long side of the trailing edge and extends along its first and second side toward the corrugations. The clip extends, when viewed in its cross-section at right angles to the corrugation's maxima, at an angle to the first and second side surface of the trailing edge. The clip may have a different extent across the second side compared to the first side of the trailing edge. In a particular variant, the clip extends over the width of the second side as far as the onset of the corrugation of the vane, and on the first side it extends only across a part of the trailing edge's width, leaving some of the trailing edge free between the clip's end and the onset of the corrugation.

In a particular variant, the clip's end portions have a rounded or chamfered contour in order to ease the droplets entry into said space. Films of moisture will enter passed the rounded or chamfered contour end portions into the space between clip and trailing edge surface and run down this surface to the bottom of the vane to be collected.

In a further embodiment of the invention, the trailing edge is itself shaped in a u-shaped bend extending second onto the trailing edge plane.

The U-bent trailing edge comprises a first side and a second side, which form the two portions of the U-shape. The trailing edge extends in this embodiment from the end of the last corrugation along the trailing edge's first side forming a slight rise in the direction of a corrugation's maximum, then forming a U-turn and then finally extending the trailing edge's second side toward the end of the last corrugation. A moisture film can collect inside the space formed by the bend and run down to the bottom of the vane.

In a further embodiment, the trailing edge comprises one or more grooves on its planar surface extending parallel to the maxima and minima of the corrugations to the bottom end of the vane. Droplets on the surface will collect in the grooves and follow to the bottom of the vane.

In a further embodiment, the trailing edge comprises on its ultimate edge protrusion extending away from both the first and second side. The protrusion extends, when viewed in a cross-section a right angles to the direction of the corrugations' maxima, from the trailing edge's end toward the corrugations. For example, the protrusion has together with the trailing edge, a cross-sectional shape of an arrow. Moisture may collect in the space between trailing edge surface and protrusion and be guided to the bottom of the vane.

DETAILED DESCRIPTION

Figure 1A:
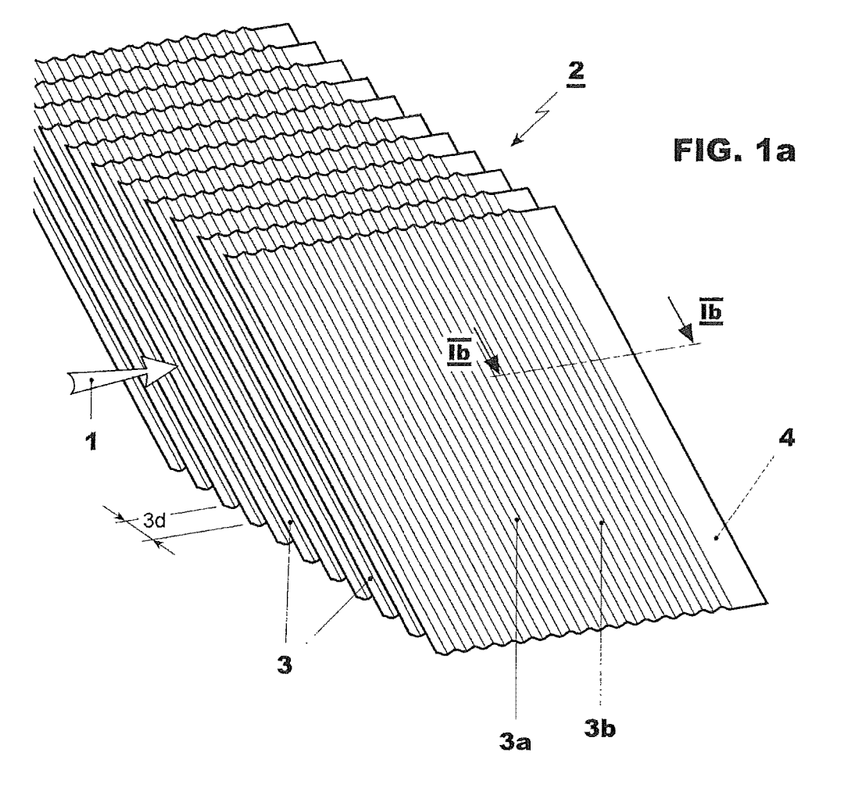
FIG. 1a shows a perspective view of a bundle of corrugated vanes as may be arranged in a moisture separator according to the invention.
Figure 1B:
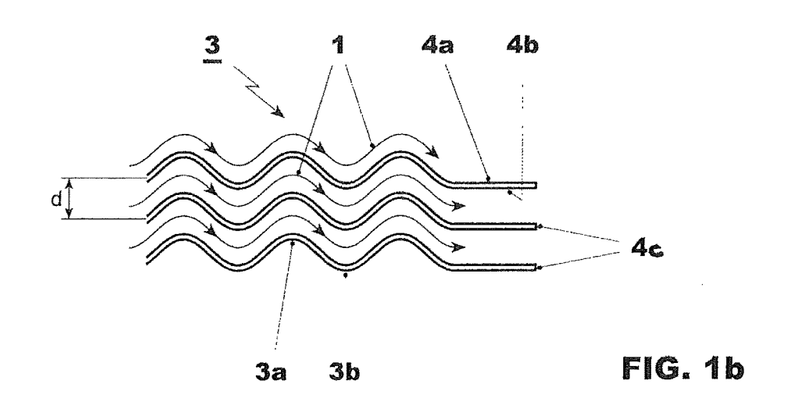
FIG. 1b shows a cross-section of the corrugated vane of FIG. 1a along the line Ib-Ib.

A moisture separation apparatus according to the invention is shown in figure la as it may be used for the separation of moisture from a vapor flow 1, for example a steam flow for a steam turbine of a power plant, where the steam flow is directed via an inlet in an apparatus housing onto a bundle 2 of vanes 3. The vanes 3 are corrugated on a large part of its area, the corrugations having maxima 3a and minima 3b. The steam flow 1 passes through the narrow spacing 3d between the vanes 3, which are a fraction of the period of the corrugation's period. The spacing between the vanes is assured by spacer elements 10 as shown for example in FIG. 2a. The vapor flow passing between the vanes follows an undulating path due to the corrugation and exits the panel and the apparatus at the end of the vanes 3 via trailing edges 4 shaped substantially planar. While moisture droplets in the vapor flow are impeded by the corrugations as the flow passes over them and collect there by flowing down to the bottom of the vanes, a significant amount of moisture remains still in the vapor flow at the end of the vane and collects on its trailing edge 4. For the purposes of definition and identification within this document, the trailing edge 4 may be described as shown in the cross-sectional view in FIG. 1b having two sides, a first side 4a, a second side 4b, and an end face 4c, and furthermore the corrugations having maxima 3a and minima 3b extending parallel to the length l of the trailing edge 4.

Figure 2A:
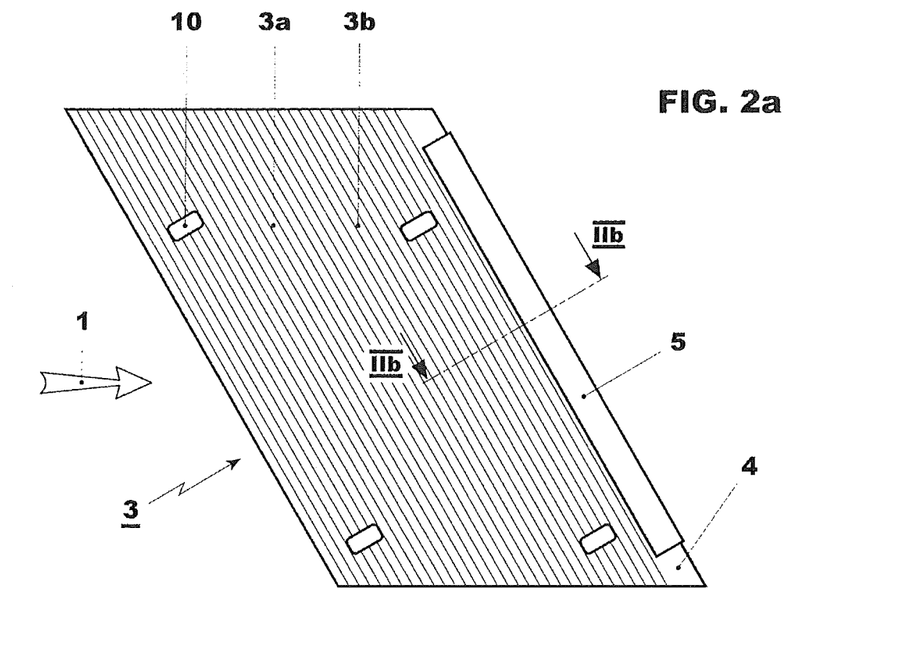
FIG. 2a shows an individual corrugated vane of an embodiment of the moisture separator according to the invention and in particular a trailing edge having clip-like means to collect moisture.
Figure 2B:
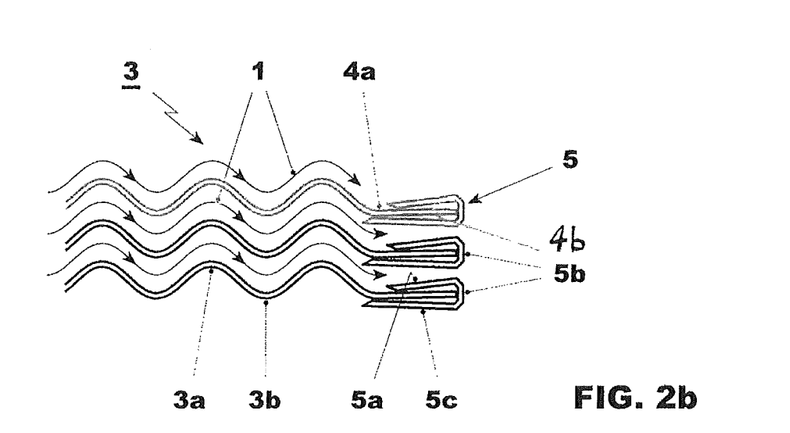
FIG. 2b shows a cross-section of the corrugated vane of FIG. 2a along the lines IIb-IIb.

FIG. 2a shows a front view of one of the vanes 3 of the bundle as shown in FIG. 1. The steam flow 1 is indicated to pass over the corrugations 3a, 3b of the vane from the left and leave the vane over the trailing edge 4. The figure shows a first embodiment of the means to collect moisture on the surface of the trailing edge, where these first means are a clip-like attachment 5 enveloping the end face of the trailing edge and extending toward the corrugations of the vane. The cross-sectional view in FIG. 2b shows the specific inventive shape of the clip 5 arranged over the end face 4c of the trailing edge 4 and extending over the entire length l of the vane's trailing edge. The clip 5 having a first leg 5a, a bend portion 5b, and a second leg 5c, is attached to the end face 4c of the trailing edge for example by means of spot welds. Its first leg 5a extends over the first side 4a where the second leg extends over the second side 4b of the trailing edge. Both legs 5a and 5c extend at a slight angle to the surfaces of the trailing edge.

The clip as shown allows moisture having collected on the first side 4a and flowing down from a corrugation maximum to be received by the clip's end and flow into the space between the clip and the trailing edge surfaces. Similarly, moisture having collected on the second side 4b and flowing along toward a corrugation minimum will be collected by the leg 5c extending to the point, where the moisture may otherwise be re-entrained by the steam flow. In the example shown, the second leg 5c extends to the point where the corrugation begins, whereas the first leg 5a extends only over part of the planar first side of the trailing edge leaving part of it free. The clip's legs can however also be of equal length. A suitable choice of the length of the clip's legs depending on the shape and type of the corrugation can optimize the effective direction of a moisture film into the space between trailing edge surface and the clip 5, from where the moisture can run down to the bottom of the vane. Rounded or chamfered end portions of the clip's legs can further optimize the effective direction of moisture into the clip.

Figure 3A:
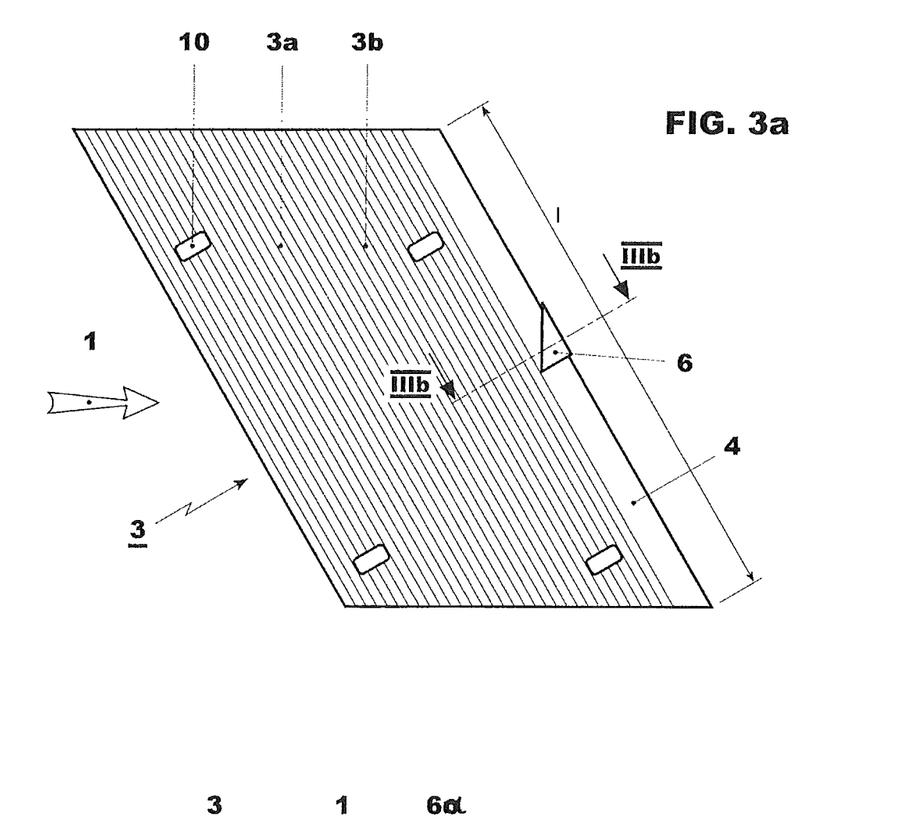
FIG. 3a shows an individual corrugated vane of an embodiment of the moisture separator according to the invention and in particular a trailing edge having a further embodiment of clip-like means arranged in the mid-region of the trailing edge to direct moisture to the bottom of the vane.
Figure 3B:
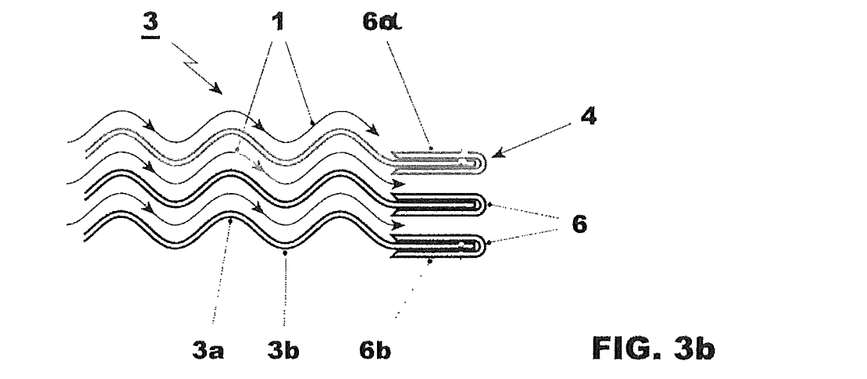
FIG. 3b shows a cross-section of the corrugated vane of FIG. 3a along the lines IIIb-IIIb.

FIGS. 3a and 3b show a variant of the clip of FIGS. 2a and 2b, where clip 6 attached to the trailing edge 4 extends over a portion of the trailing edge 4, for example at approximately the mid-point of the length of the trailing edge. The device 6 has for example a triangular shape having one side extending vertically. In its cross-sectional view the clip has symmetrically shaped legs 6a and 6b extending parallel to the trailing edge's first and second sides.

Figure 4A:
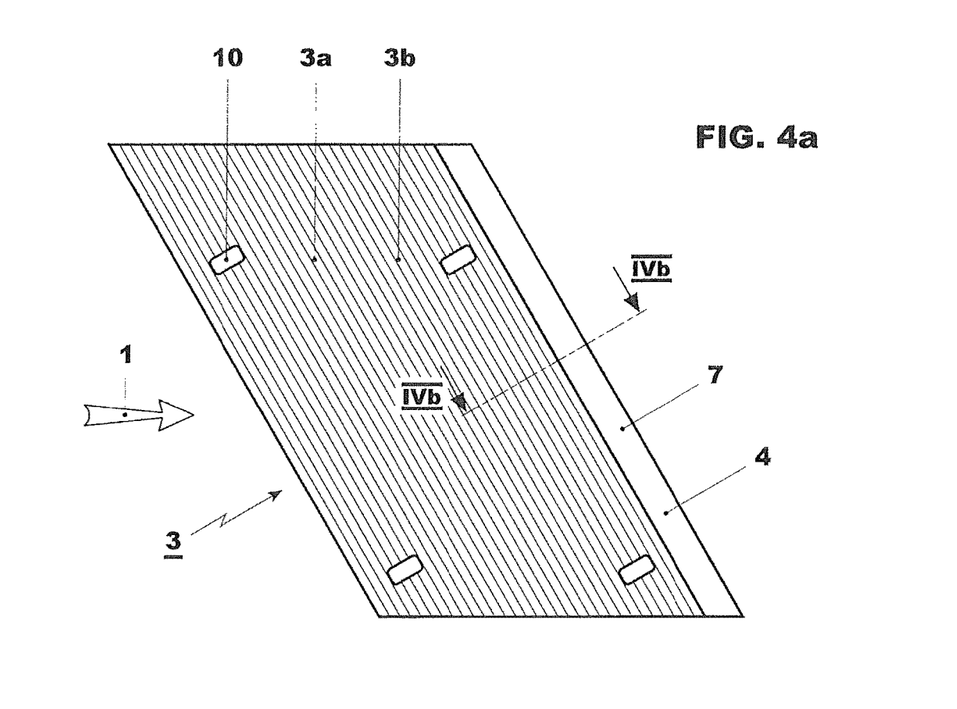
FIG. 4a shows an individual corrugated vane of an embodiment of the moisture separator according to the invention and in particular a trailing edge having a U-bend means to collect moisture.
Figure 4B:
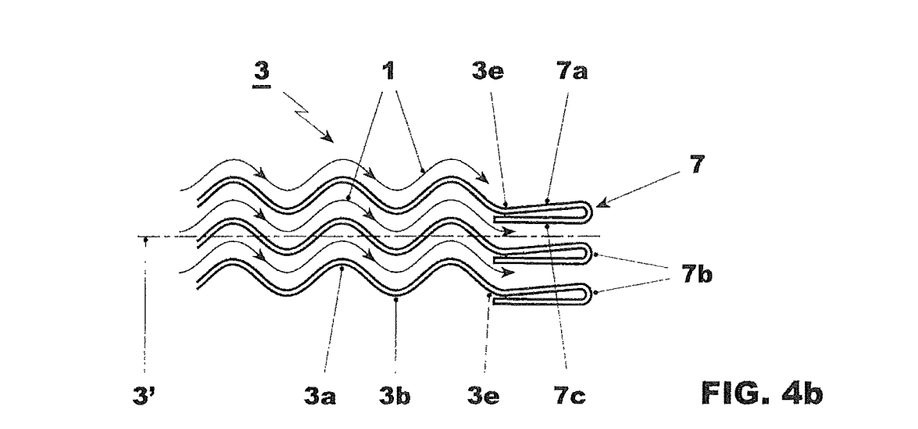
FIG. 4b shows a cross-section of the corrugated vane of FIG. 4a along the lines IVb-IVb.

FIGS. 4a and 4b show a further embodiment of the invention, where the trailing edge itself is shaped to generate the means of to collect the moisture. The trailing edge is bent in a substantially U-shaped form, having first arm 7a, a U-turn bend 7b, and a second arm 7c. The first arm 7a of the U-shape is directed at a small angle away from the mid-axis 3' of the corrugation of the vane 3. The second arm 7c of the U-shape extending substantially parallel to the mid-axis 3'. The second arm 7c extends as far as the onset of the corrugation at point 3e.

Figure 5A:
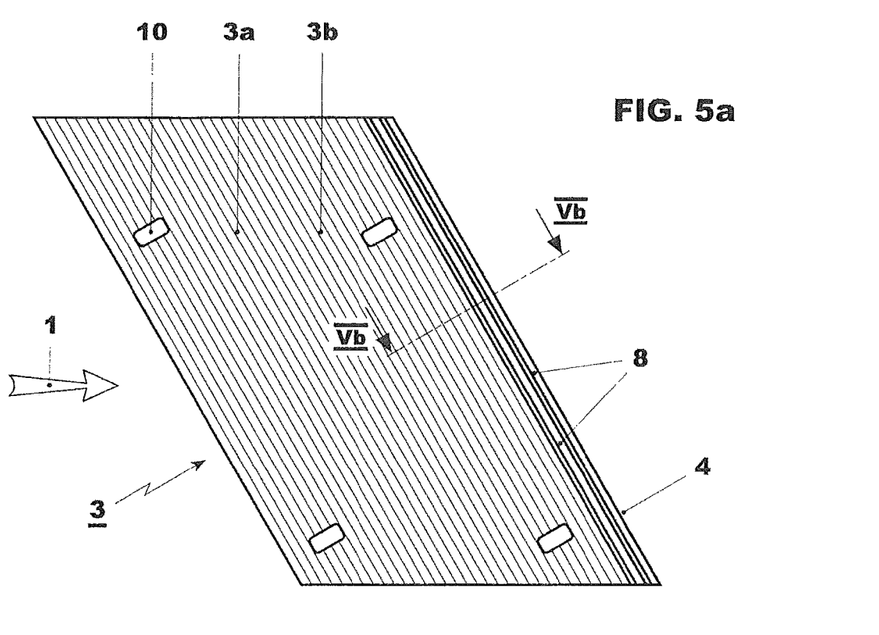
FIG. 5a shows an individual corrugated vane of a further embodiment of the moisture separator according to the invention having grooves imparted on the trailing edge's surface.
Figure 5B:
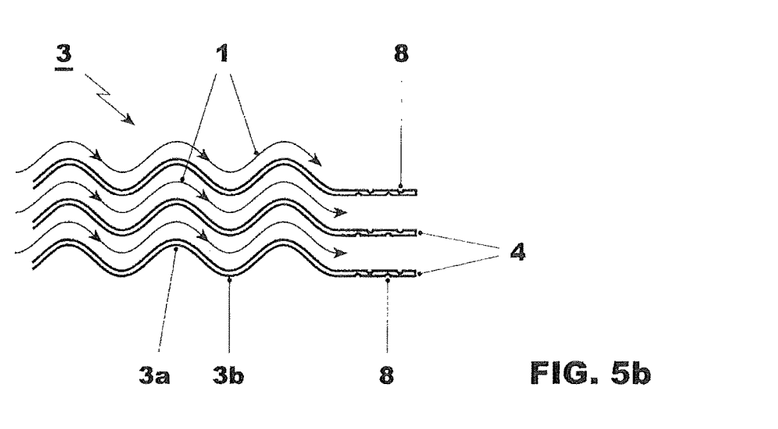
FIG. 5b shows a cross-section of the corrugated vane of FIG. 5a along the lines Vb-Vb.

A further embodiment of the invention as shown in FIGS. 5a and 5b comprises as a means of collecting the moisture on the trailing edge one or more grooves 8 on one or both trailing edge surfaces. Moisture droplets adhere to the groove and are directed to the bottom of the vane.

Figure 6:
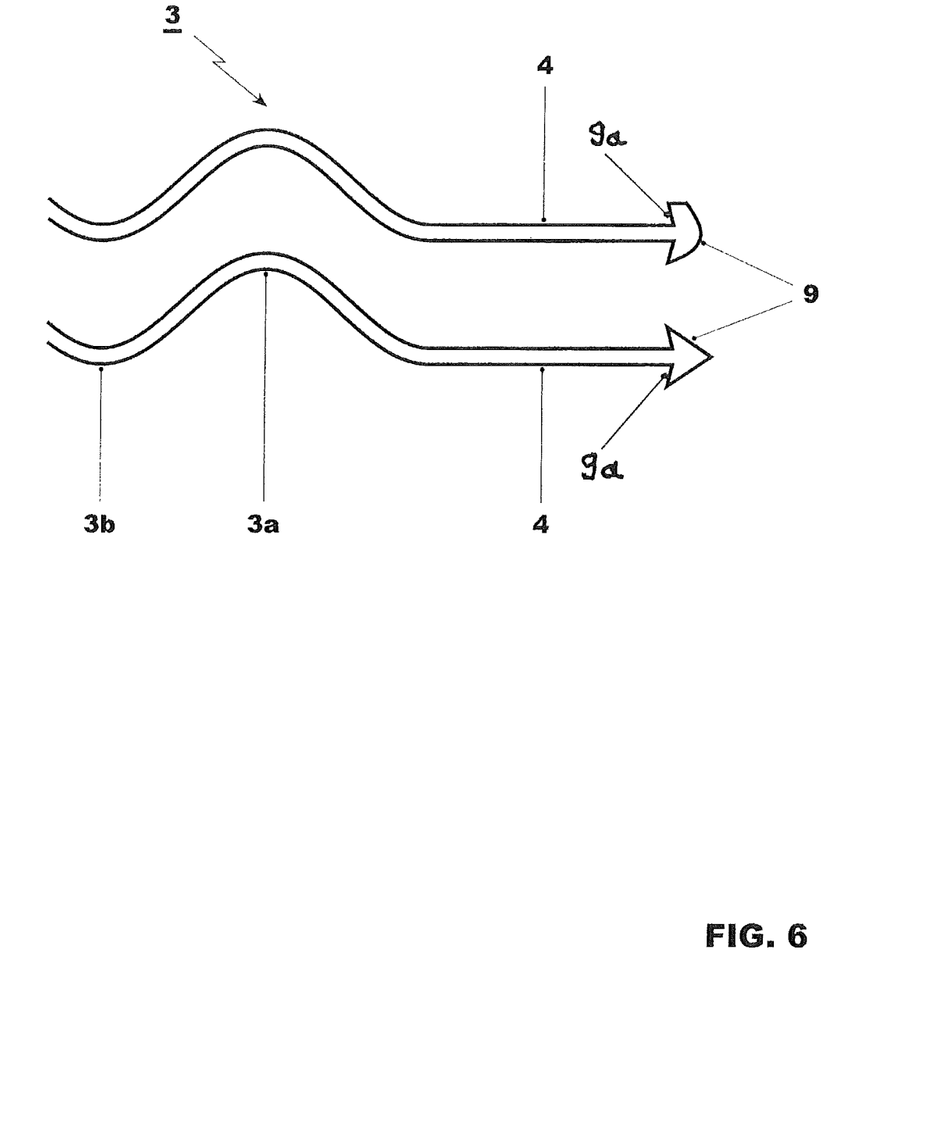
FIG. 6 shows a cross-section of an individual corrugated vane of a further embodiment of the moisture separator according to the invention having a protrusion on the trailing edge's end face.

FIG. 6 shows a further embodiment of the invention, where the final end face 4c of the trailing edge comprises a protrusion 9 extending away from the trailing edge surface and having a portion 9a that extends towards the corrugation 3a, 3b in the manner of a barb. The protrusion can have for example the shape of an arrow or any barb-like device. Moisture can collect in the space enveloped by the trailing edge surfaces and the barb and be directed to the bottom of the vane.

The invention claimed is:

1. A moisture separation apparatus for a steam turbine power plant for the generation of electricity, the moisture separation apparatus comprising:
    a housing with an inlet for a gas or vapor or steam flow,
    a bundle of vanes arranged within the housing, where the vanes are vertically arranged in parallel and evenly spaced from one another, and each vane comprises a corrugated portion arranged closest to the inlet for the gas or vapor or steam flow and a trailing edge portion arranged opposite from the inlet, and
    a clip attachment on at least one vane of the bundle of vanes enveloping an end face of the trailing edge portion and extending over a first surface of the trailing edge portion and a second surface of the trailing edge portion, wherein the clip attachment comprises two legs converging and extending at an angle to the first surface of the trailing edge portion and to the second surface of the trailing edge portion, and wherein the two legs of the clip attachment have chamfered end portions.

2. The moisture separation apparatus according to claim 1, wherein the clip attachment is arranged over the end face of the trailing edge portion and extends over a length of the trailing end portion.

3. The moisture separation apparatus according to claim 1, wherein the clip attachment comprises a first leg, a second leg, and a bend portion, attached to the end face of the trailing edge portion.

4. The moisture separation apparatus according to claim 3, wherein the clip attachment is attached to the end face of the trailing edge portion by means of spot welds.

5. The moisture separation apparatus according to claim 3, wherein the first leg extends over the first surface of the trailing edge portion and the second leg extends over the second surface of the trailing edge portion.

6. The moisture separation apparatus according to claim 1, wherein the clip attachment is configured for collecting moisture on the first surface of the trailing edge portion and for directing the moisture to a bottom end of the at least one vane.

\* \* \* \* \*